H. W. SCHATZ.
BELT SHIFTER.
APPLICATION FILED JULY 8, 1914.
1,125,404.
Patented Jan. 19, 1915.
2 SHEETS—SHEET 1.
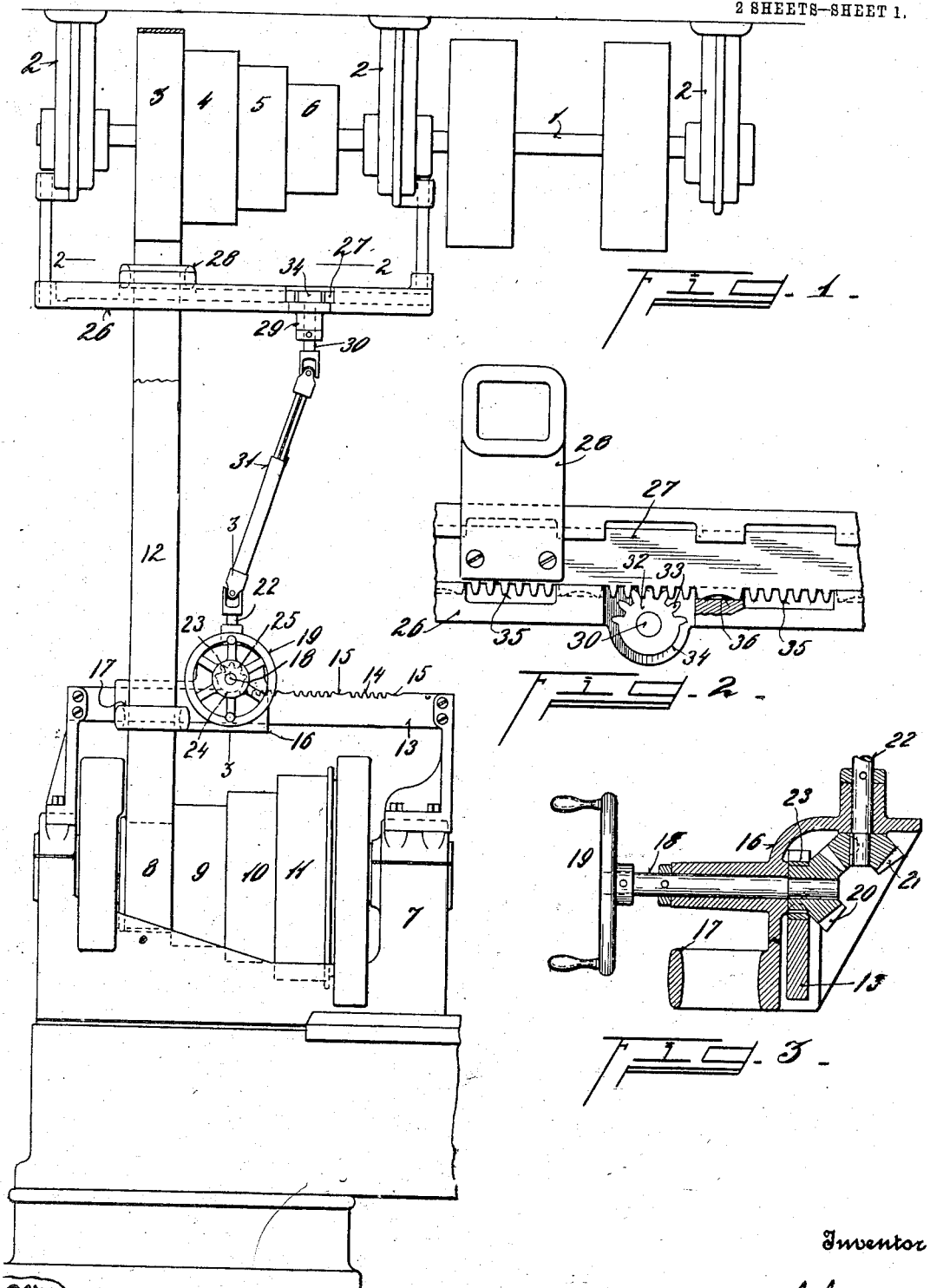
Witnesses
C. B. Foster
L. A. Beck
Inventor
Herman W. Schatz
By Wood & Wood
Attorneys

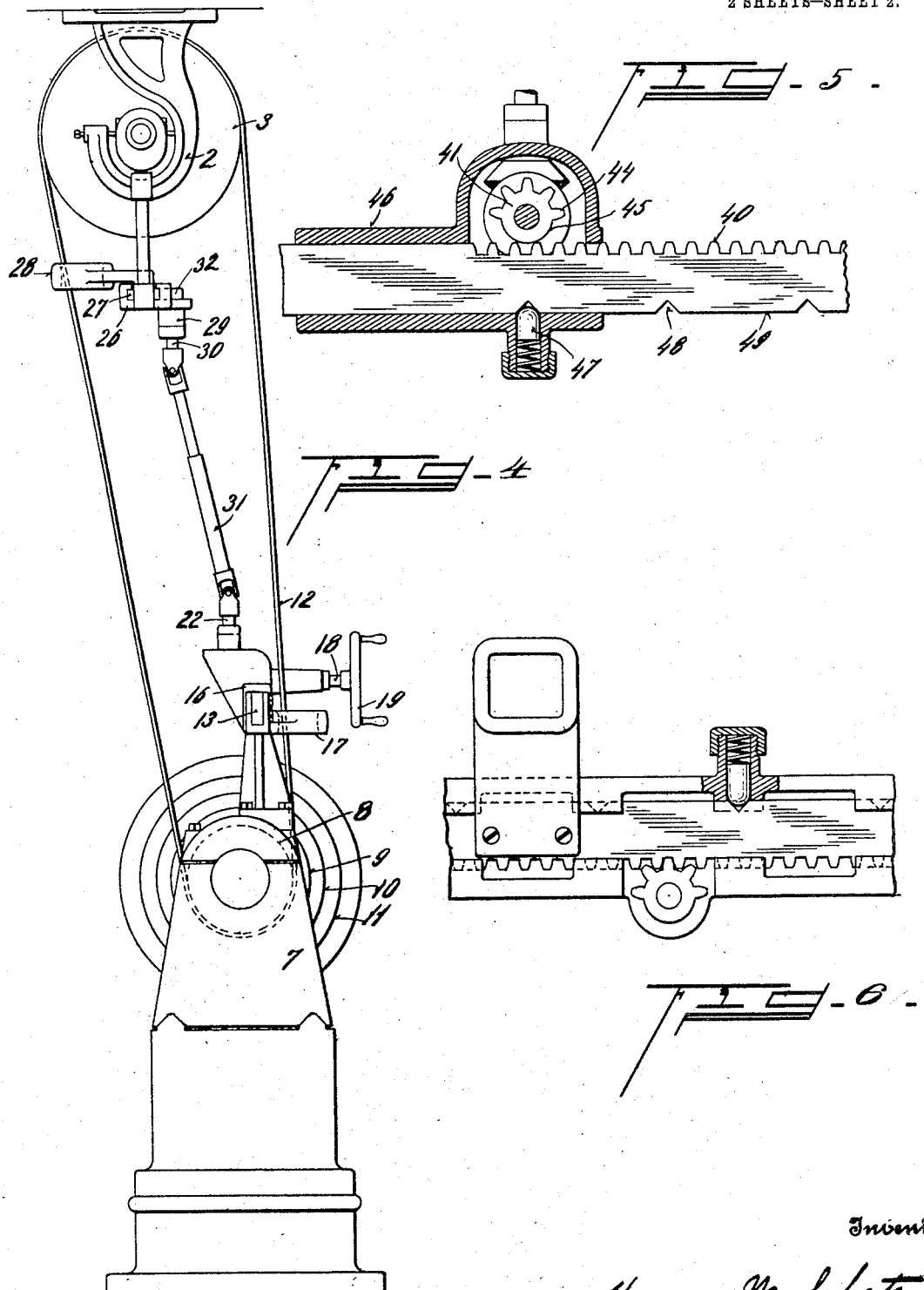

UNITED STATES PATENT OFFICE.

HERMAN W. SCHATZ, OF NORWOOD, OHIO, ASSIGNOR TO THE AMERICAN TOOL WORKS COMPANY, OF CINCINNATI, OHIO, A CORPORATION OF OHIO.

BELT-SHIFTER.

1,125,404.

Specification of Letters Patent.

Patented Jan. 19, 1915.

Application filed July 8, 1914. Serial No. 849,630.

*To all whom it may concern:*

Be it known that I, HERMAN W. SCHATZ, a citizen of the United States, and residing at Norwood, in the county of Hamilton and State of Ohio, have invented a new and Improved Belt-Shifter, of which the following specification is a full disclosure.

My invention relates to a belt shifting mechanism for varying speeds.

One of the objects of the invention is to provide means for mechanically shifting a belt relative to transposed step pulley wheels, commonly called cone-pulleys.

Another object of the invention is to provide a positively entrained driving means constituting the belt shifter, operative alternatively at opposite ends of the belt for shifting one end in advance of the other.

Another object of the invention is to provide a simple, convenient and accessible actuator which will mechanically shift the belt alternatively at its opposite ends.

Another object of the invention is to combine with the driving means transmission elements rendered inoperative automatically at predetermined intervals appropriate to the alternate step shifting of the belt ends.

The principle of the invention is susceptible of various modifications and the concrete embodiment illustrated represents only one of the preferred disclosures of the invention, the features of which will be more fully disclosed in the description of the accompanying drawings, forming a part of this specification, in which:—

Figure 1 is a front elevation of my improved belt shifting device as applied to the ordinary type of engine lathe. Fig. 2 is a plan section on line 2—2 of Fig. 1. Fig. 3 is a section on line 3—3 of Fig. 1. Fig. 4 is an end elevation. Figs. 5 and 6 show a modified form of retaining device for retaining the belt-shifting elements in their several positions.

The line shaft 1 is supported by suitable suspension brackets 2. Said shaft carries a pulley-cone comprising the stepped wheels 3—4—5—6. The machine frame 7 carries the inverse step pulley wheels 8—9—10—11, in the respective parallel vertical planes of the driving wheels 3—4—5—6, the two cones having parallel axes, as shown in Fig. 1, and the wheels 3 and 8 being connected by belt 12. To shift the belt for a speed change obviously the upper end of the belt must be moved from wheel 3 to 4 before the lower end of the belt can be moved from wheel 8 to 9. And so, in the reverse shift of the belt the lower end must move from wheel 11 to 10, the larger to the smaller, before the upper end of the belt can move from wheel 6 to 5, that is, the smaller to the next larger wheel. On frame 7 is a rack bar 13 having a series of rack teeth 14 and intermediate segmental blanks 15 determining the step movements of the gear operated belt shifter.

The belt shifter mechanism for the lower end of the belt comprises a member 16 adapted to be reciprocated in step movements on the rack bar 13 and having a belt carrier or shifter 17 through which one loop of the belt 12, travels, the rack 13 and member 16 being positioned above the lower step pulleys. On the member 16 is a shaft 18 upon the outer end of which is a hand operating wheel 19. Upon the inner end of shaft 18 is a beveled gear 20 meshing with beveled gear 21 on shaft 22.

On the sleeve of gear 20 is a pinion 23 meshing with the teeth of the rack 13. The pinion 23 is cut out on the pitch line to form a segment blank 24, the pinion and rack being so engaged that when shaft 18 is rotated, blank 24 will be periodically engaged with one of the rack blanks 15, rendering the transmission inoperative until the further rotation of shaft 18 brings the segmental pinion teeth 25 into intermesh with one of the groups of rack teeth 14.

Suspended from the lower portion of the brackets 2 is a member 26 supporting the traveling rack 27, constituting the upper belt shifter. This rack has a belt carrier 28 through which passes one of the loops of the belt, and said rack constitutes the upper belt shifter, longitudinally slidable in relation to its support, and operated by a fixed gear drive. Secured to the support 26 is a member 29 in which is mounted shaft 30 connected to shaft 22 by universal joint shaft 31 which is also longitudinally extensible to permit of movement of the member 16. On the upper end of shaft 30 is a pinion 32 having the segment teeth 33 and the blank segment 34 formed on the pitch line of the pinion, the traveling rack 27 being formed with the groups of rack teeth 35 and segment blanks 36. The mechanisms are substantially the same at each end of the belt, but preferably at the lower end the rack is fixed and the gear mechanism has rectilineal motion, shifting this end of the belt, whereas at the other end, preferably the rack constitutes the rectilineally moving or belt shifting element and the driving gear the fixed element.

Although preferred, it is not essential to provide the segmental blanks on the rack intermediate groups of rack teeth and to form the pinion blanks on the pitch line, although by this construction the pinion and rack blank segments have a bearing engagement during the inoperative period of the belt shifter. The equivalent, however, is shown in Figs. 5 and 6, wherein the rack teeth 40 are shown as continuous, the pinion 41 having a cut out peripheral portion 45 completely clearing the rack teeth during this portion of the rotation of the shaft. When employing the construction shown in Fig. 5 representing the lower belt shifter, I preferably provide the rectilineally moving member 46 with a spring plunger 47 for automatically engaging and disengaging the detents 48 of the rack bar 49.

In Fig. 6 showing the upper shifter there is employed a similar spring plunger actuating with the rack bar indents, it being obviously a matter of relative movement whether the rack is the stationary or the movable member.

In operation the parts being in the position shown in Fig. 1, the pinion and rack at the lower end are in non-transmitting position, while at the upper end the pinion and rack are in transmitting intermesh, so that when the handle 19 is given an appropriate partial rotation the upper end of the belt will be shifted from wheel 3 to wheel 4, which will then render the upper transmission inoperative and the lower transmission operative, shifting the lower end of the belt from wheel 8 to wheel 9. At the end of each movement the transmission will be in the same relative position as initially described, ready for the next step movement, and the same respective movements will be effected in transposed relationship when wheel 19 is rotated in the opposite direction to reverse the belt shift, that is to say, that end of the belt which is moving from the larger to a smaller wheel will be first shifted and the movement of the other end of the belt from a smaller to a larger wheel will be the second shift, regardless of whether the belt is being shifted to the right or left.

Having thus described my invention, I claim as new and desire to secure by Letters Patent of the United States:—

1. In combination with belt-connected, transposed step-pulleys, a belt carrier for each end of the belt, carrier operating means comprising mechanism for converting rotary into rectilineal motion having a movable and a fixed rack, and means rendering said motion conversion alternately inoperative with respect to the two carriers.

2. In combination with belt-connected, transposed step-pulleys, a belt carrier for each end of the belt, carrier operating means comprising rack and pinion mechanism for converting rotary into rectilineal carrier motion, one of said racks being fixed and the other reciprocal, means rendering said conversion alternately inoperative with respect to the two carriers, and means transmitting the rotary motion from one carrier operating means to the other.

3. In combination with belt-connected, transposed step-pulleys, a belt carrier for each end of the belt, carrier operating means comprising rack and pinion mechanism for converting rotary into rectilineal carrier motion, the lower rack being fixed and the upper being movable, means rendering said conversion alternately inoperative with respect to the two carriers, and means transmitting the rotary motion from the one carrier operating means to the other, said carrier operating means being arranged so that the advancing step shifted belt end moves from a larger to a smaller diameter pulley wheel, while the following step movement of the other end of the belt is from a smaller to a larger diameter pulley wheel.

4. In combination with belt-connected, transposed step-pulleys, a belt carrier for each end of the belt, a rack and pinion mechanism for each carrier arranged to shift the carriers in the axial plane of the step-pulleys, means rendering the two rack and pinion mechanisms alternatively inoperative, one of said racks being a stationary and the other a rectilineally moving member, and motion transmission means connecting the two rack and pinion mechanisms.

5. In combination with belt-connected, transposed step-pulleys, a belt carrier for each end of the belt, a rotary mechanism for operating each carrier, motion transmission connecting said rotary mechanisms and a fixed and a movable rack coacting with the two rotary mechanisms for alternately step-shifting the two belt carriers.

6. In combination with belt-connected, transposed step-pulleys, means at each end of the belt for converting rotary into rectilineal motion comprising a fixed and a movable rack, a belt carrier for each end of the belt actuated by the rectilineal motion, means operatively connecting the two belt carrier operating mechanisms and automatic means rendering the motion transmission alternately inoperative at opposite ends of the belt for laterally step-shifting the belt carriers appropriate to the steps of the pulley wheels.

7. In combination with belt-connected, transposed step-pulleys, a belt carrier at each end of the belt, belt carrier operating means comprising rack and pinion mechanism for converting rotary into rectilineal motion, there being one fixed and one movable rack, the belt carriers being actuated by the rectilineal motion to laterally shift the belt, means for rendering said mechanisms alternately inoperative with respect to the two belt carriers for shifting one end of the belt in advance of the other, and a flexible transmission connecting the two belt shifted operating mechanisms.

8. In combination with belt-connected, transposed step-pulleys, a belt carrier at each end of the belt, belt carrier operating means comprising rack and pinion mechanism for converting a rotary into rectilineal motion, there being a fixed and a movable rack, the belt carriers being actuated by the rectilineal motion to laterally shift the belt, means for rendering said mechanisms alternately inoperative with respect to the two belt carriers for shifting one end of the belt in advance of the other, a flexible transmission connecting the two belt shifting operating mechanisms, and means for positioning the belt shifting mechanisms during their inoperative periods.

In witness whereof, I hereunto subscribe my name, as attested by the two subscribing witnesses.

HERMAN W. SCHATZ.

Witnesses:
EMMA SPENER,
L. A. BECK.